United States Patent [19]
Goldstein

[11] Patent Number: 5,282,086
[45] Date of Patent: Jan. 25, 1994

[54] BINOCULAR TELESCOPE

[75] Inventor: Pinchas Goldstein, Jerusalem, Israel

[73] Assignee: Front-Row Products Inc., Wilmington, Del.

[21] Appl. No.: 840,262

[22] Filed: Feb. 24, 1992

[30] Foreign Application Priority Data

Feb. 22, 1991 [IL] Israel .................................... 097330

[51] Int. Cl.⁵ .............................................. G02B 23/18
[52] U.S. Cl. .................................... 359/407; 359/408; 359/410
[58] Field of Search ............................ 359/399–435, 359/480, 481, 811–830; 2/8, 10, 12, 199, 453; 351/155, 204–207

[56] References Cited

U.S. PATENT DOCUMENTS

| | | | |
|---|---|---|---|
| 2,598,145 | 5/1952 | Steadman, Jr. | 359/410 |
| 2,649,019 | 8/1953 | Hartline et al. | 359/409 |
| 2,935,910 | 5/1960 | Schmidt | 359/481 |
| 3,865,468 | 2/1975 | Holcomb | 359/409 |
| 4,239,352 | 12/1980 | Dockal | 351/57 |
| 4,449,787 | 5/1984 | Burbo et al. | 359/411 |
| 4,541,125 | 9/1985 | Phillips | 2/10 |
| 4,651,951 | 3/1987 | McFarlane | 359/409 |
| 4,670,912 | 6/1987 | Hart | 2/209.1 |
| 4,734,939 | 4/1988 | Copp | 2/422 |
| 4,819,274 | 4/1989 | Day | 2/10 |
| 4,839,926 | 6/1989 | Choi | 2/199 |
| 4,886,340 | 12/1989 | Kanda | 359/411 |
| 4,951,316 | 8/1990 | Moody | 2/10 |
| 4,971,429 | 11/1990 | Ishido et al. | 359/409 |
| 5,181,139 | 1/1993 | Benitez | 359/410 |

FOREIGN PATENT DOCUMENTS

| | | |
|---|---|---|
| 4004248 | 8/1990 | Fed. Rep. of Germany ...... 359/411 |
| 86/005368 | 9/1986 | World Int. Prop. O. . |
| 90/03741 | 4/1990 | World Int. Prop. O. . |

Primary Examiner—Bruce Y. Arnold
Assistant Examiner—Thong Nguyen
Attorney, Agent, or Firm—Sandler Greenblum & Bernstein

[57] ABSTRACT

A binocular telescope mountable on a headgear, which comprises two optical systems, one for each of the user, each system constituting at least an objective lens and an eyelens. The telescope is pivotably attached to the headgear. When the headgear is in position on the user's head, the objective lenses and the eyelenses can be swiveled out of the way to facilitate free and unaided vision, and returned to the position of telescope-aided vision.

23 Claims, 8 Drawing Sheets

BINOCULAR TELESCOPE

BACKGROUND OF THE INVENTION

The present invention relates to a binocular telescope for short, to a binocular, mountable on a headgear such as a visored cap or a helmet; more particularly to binoculars thus mounted that can be folded out of the way to facilitate free and unaided vision.

Binoculars are widely used in theater, opera and concert performances; in spectator sports, biking, bird-watching and the like. More prolonged use, however, is liable to cause both eye strain because of the unsteadiness of the image caused by hand-held binoculars and physical discomfort due to muscular fatigue of the raised arms.

It is one of the objects of the present invention to overcome the above difficulties and to provide a binocular that can be used without the need for support by one's arms and hands, yet is removable from before one's eyes by a flip of one's hands and is as easily returned to the viewing position.

SUMMARY OF THE INVENTION

According to the invention, this is achieved by providing a binocular telescope mountable on a headgear, comprising two optical systems, one for each eye of the user, each system constituted of at least an objective lens and an eyelens, and means to attach said systems to said headgear, including pivot means about which, with said headgear in position on user's head, said objective lenses and said eyelenses can be swiveled out of the way to facilitate free and unaided vision, and returned to the position of telescope-aided vision.

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE INVENTION

Figure 1:
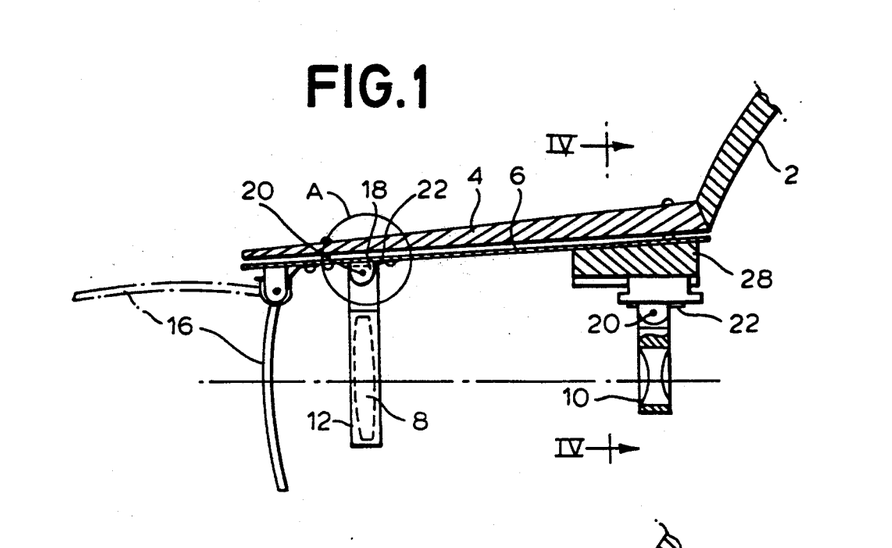
FIG. 1 is a median cross-section of a first embodiment of the binocular according to the invention, as mounted on the visor of a cap, and in the unfolded, operational state.

Referring now to the drawings, there is seen in FIG. 1 part of a cap 2 and its visor 4. To the latter is attached, preferably by riveting, a base plate 6 which carries the optical systems of the binocular. There are obviously two optical systems to the binocular. In the present embodiment, the binocular is a Galilean binocular, each system comprising a positive objective lens 8 and a negative eyelens 10 arranged in frames 12 and 14, respectively. The lenses 8 and 10 are advantageously made of a transparent plastic and are integrally molded with their respective frames 12 and 14 so that the lenses and the lens frames are integrally molded plastic components. However the lenses, but may also be made of glass and mounted in a conventional way. The lenses, or at least some of them, may be aspherical.

Also seen in FIG. 1 is a sun shield 16 which, as shown in FIG. 1, can be interposed in the optical path of the binocular if desired (solid lines) or withdrawn therefrom (dash-dotted lines).

Figure 2:
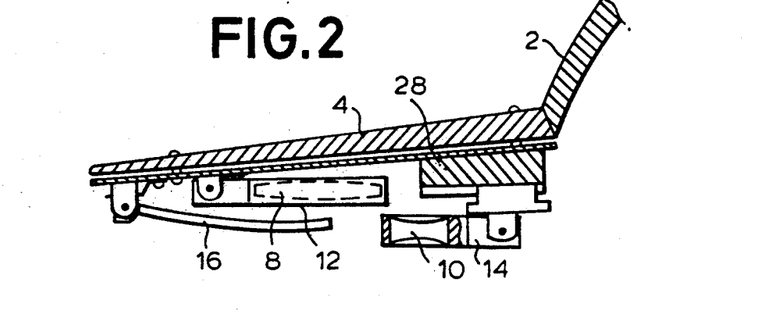
FIG. 2 shows the binocular of FIG. 1 in the folded or collapsed state.

A characteristic feature of the binocular according to the invention is the collapsibility of foldability of its optical systems, whereby free and unaided vision is easily achieved without removing the cap, by simply folding the system's components out of the way, as shown in FIG. 2. Use of the binocular is as easily resumed by snapping the components into the position shown in FIG. 1.

Figure 3:
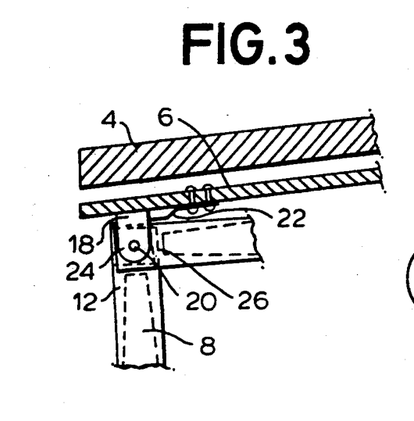
FIG. 3 is an enlarged representation of detail A of FIG. 1.

Means are thus required to define, prior to the use of the binocular, and maintain during its use, the alignment or collinearity of the optical axes of the optical components of each of the two systems. This, in the present embodiment, is achieved by means of an as such well-known mechanical flip-flop device, seen to better advantage in FIG. 3, and comprising a fork-like bracket 18 mounted on the base plate 6, to which bracket is hingedly articulated the frame 12 of the two objective lenses 8. The frame 12 can thus swivel about the pivot 20 mounted in the bracket 18. The two positions of the frame 12, namely, the operational position of FIG. 1 and the folded position of FIG. 2, are defined by a flat spring 22 of a cranked shape (FIG. 3), one end portion of which is fixedly attached to the base plate 6. In the operational position of the frame 12, the other, free end portion of the spring 22 presses against the upper end face 24 of the frame 12. On the other hand, the and folded position is defined by the free end portion of the spring 22 pressing against the lateral surface 26. The two positions are attained by manually urging the frame 12 in the desired direction. After overcoming the resistance of the spring 22 beyond a certain point, the frame 12 will snap into position.

The same bi-stable feature is also provided for the frame 14 which incorporates the eyelens 10, or for the sun shield 16 (FIG. 1). The latter has, in fact, three stable positions: the position of use as seen in FIG. 1; the folded-down position as shown in FIG. 2, and the raised position indicated by dash-dotted lines in FIG. 1, when the shield 16 is not wanted for viewing. The pivots 20 enable the objective lenses and the eyelenses to swivel or pivot about axes extending in planes parallel to the corneal plane of a user's head.

Figure 4:
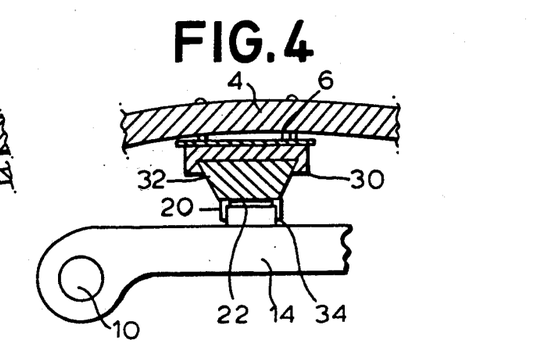
FIG. 4 is a view in cross-section along plane IV—IV of FIG. 1.

Another feature of this embodiment is the adjustability of the distance between the objective lens 8 and the eyelenses 10, that is, the so-called diopter adjustment, to suit the individual user. The arrangement (FIG. 4) includes a block 28 attached to the base plate 6 and comprising a female dovetail 30 in which is slidingly accommodated a male dovetail 32. To the latter is attached a fork-like bracket 34, which also carries the flat spring 22, the purpose and effect of which was explained in conjunction with the objective lens 8.

Figure 5:
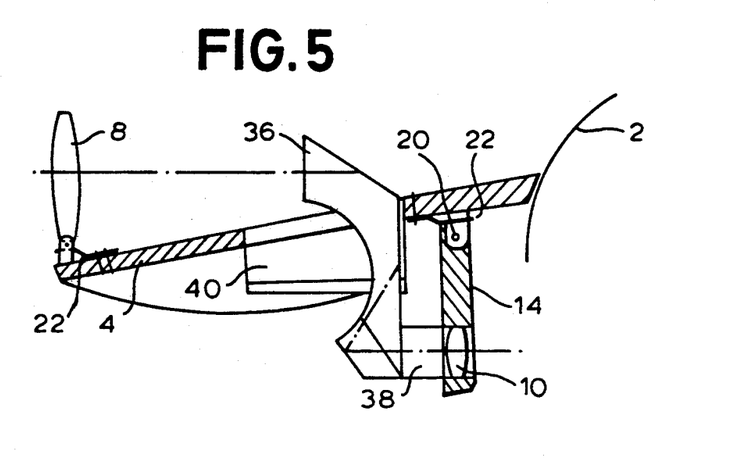
FIG. 5 represents another embodiment of the invention, being a terrestrial binocular with a roof prism as erector, in the operational state.
Figure 6:
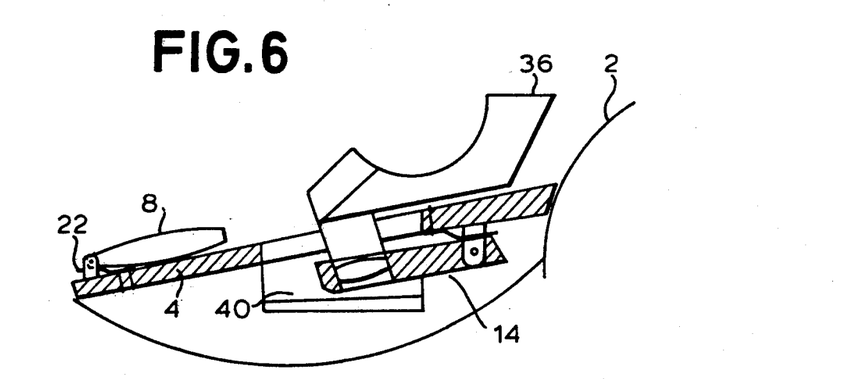
FIG. 6 shows the binocular of FIG. 5 in the collapsed state.

The embodiment shown in FIGS. 5 and 6 is of the terrestrial type, having objective lenses 8 and eyelenses 10 which are both positive and, therefore, need an erecting element for each of the two systems which, in this particular case, is a roof prism 36 of the Leman type, which can be formed of plastic.

As can be seen in FIG. 5, the erecting prism 36 is attached to the frame 14 of the two eyelenses 10 by means of an optical coupling element 38, with the optical axis of the system indicated by a dash-dotted line.

For each of the two systems, an aperture 40 is provided in the visor 4, through which the prism 36 protrudes during use, and through which the entire prism 36 can be moved to the upper side of the visor 4 when the binocular is to be collapsed after use (see FIG. 6), or when the eyelenses 10 are to be temporarily swung out of the way for free vision. (For the latter purpose, it is not necessary to fold down the objective lens 8, as it is mounted on top of the visor 4 and thus does not interfere with free vision.)

The above-mentioned flip-flop mechanism comprising the flat springs 22 is provided here, too, and ensures proper relative orientation and stability of the optical components in the unfolded, operational state, as well as the stability of these components in the compacted, collapsed state of the binocular.

The relatively large eye-relief of this type of optical system is particularly advantageous for wearers of spectacles, as it allows larger distances between the eyepiece lens and the user's eye.

Figure 7:
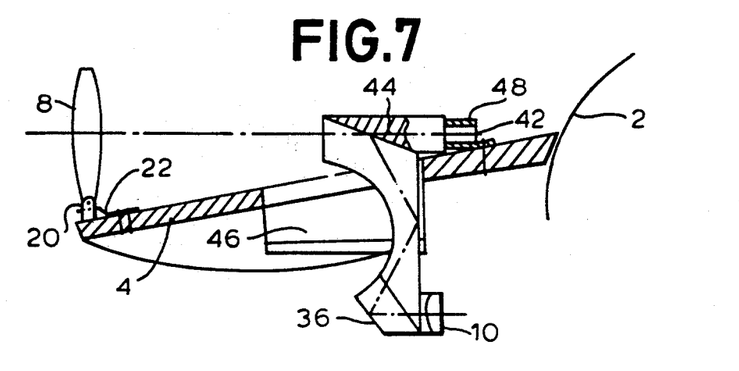
FIG. 7 illustrates another embodiment with an erector prism, also permitting matching of the user's enterpupillary distance.

The binocular of the embodiment illustrated in FIG. 7 has similar systems, each being a terrestrial telescope with a Leman roof prism for an erector element. However, as opposed to the embodiment of FIGS. 5 and 6, the prism 36 and the eyelens 10 of each system are not raised upwards to obtain free, unaided vision, but are swung sideways by swiveling them about a pivot 42 which is part of a block 44 to which the prism 35 is cemented. A slot 46 is provided in the visor 4 for each prism 36, long enough for the lower end thereof to be swung out of the field of view of the user's eyes. The pivot 42, the axis of which is collinear with the optical axis of the objective lens 8, is rotatably mounted in a bracket 48 fixedly attached to the visor 4. Means (not shown) are provided to axially retain the pivot 42 in the bracket 48 and the produce a sufficient amount of friction to stabilize the instantaneous position of swivel of the prism unit.

A great advantage of this swivel feature resides in the fact that by swiveling the prisms 36, the distance between the eyelenses 10 (which are advantageously cemented to the lower portions of the prisms 36) can be made to match the interpupillary distance of the user, which greatly enhances binocular vision and reduces eye strain.

As with the previous embodiment, the slots 46 are of sufficient length to enable the prisms 36 to be swung out of the user's field of view when unaided vision is desired.

Figure 8:
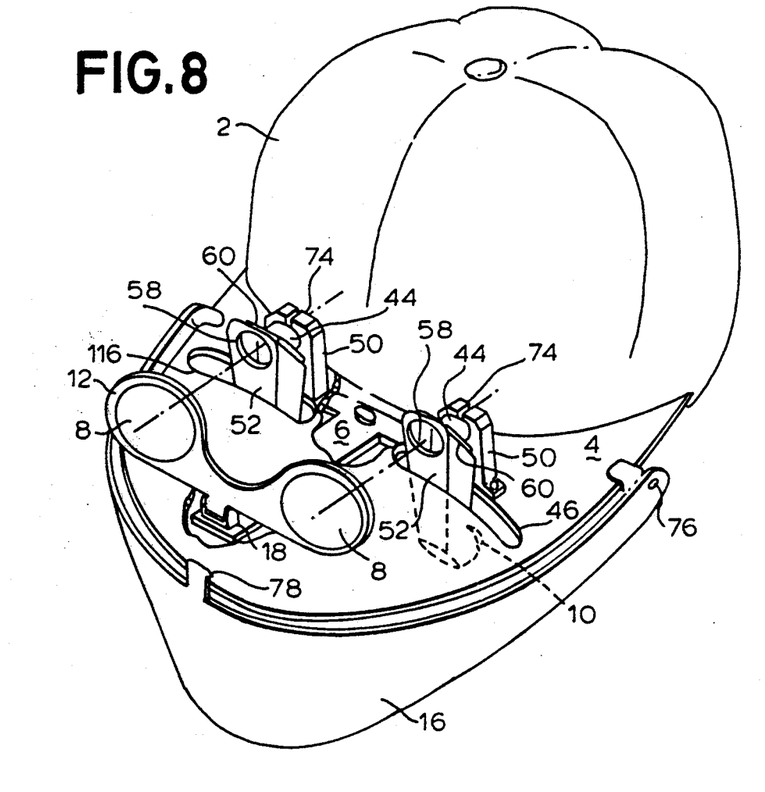
FIG. 8 shows still another embodiment of the binocular according to the invention, in which the axis-displacing element is a periscope-like structure.
Figure 9:
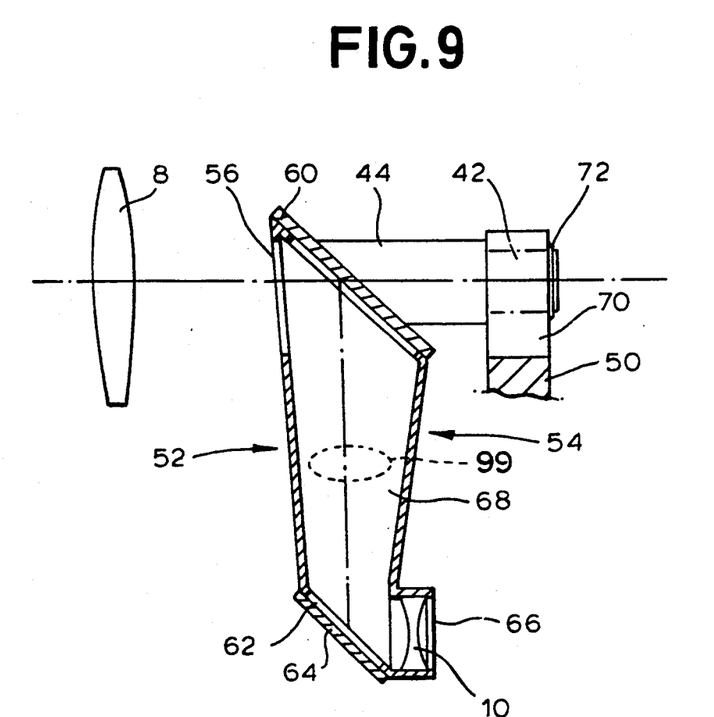
FIG. 9 is an enlarged, cross-sectional view of the periscope-like structure of FIG. 8.

Another embodiment incorporating the swiveling feature of the previous embodiment is the visor-mounted binocular of FIGS. 8 and 9, except that the latter relates to a Galilean-type binocular and the swiveling, axis-displacing element is not a prism, but a periscope-like structure using plane mirrors.

FIG. 8 shows a cap 2 and a visor 4, to the underside of which is attached to a T-shaped base plate 6. To the upright of the T is attached a bracket 18, to which is hingedly articulated the frame 12 of the objective lenses 8. Also mounted on this part of the base plate 6 is the earlier-mounted flip-flop spring 22 (not shown), which permits the frame 12 to assume either the upright, operational position shown in the drawing, or a folded-down position. The cross bar of the T carries two posts 50. The latter support the already-mentioned periscope-like axis-displacing element 52 shown to better advantage in FIG. 9.

There is seen a tapering housing 54 having a front wall with an entrance aperture 56, a ceiling aperture 58 covered by a top mirror 60, a bottom aperture 62 covered by a bottom mirror 64 and a rear wall with an exit aperture 66 in which is mounted the negative eyelens 10. The sidewalls 68 are fully closed.

The mirrors 60 and 64 are advantageously first-surface mirrors to avoid double reflection. To the top mirror 60 which is fixedly attached to the housing 54, there is cemented a block 44 ending in a pivot 42, the geometrical axis of which is collinear with the optical axis of the objective lens 8 and parallel to the optical axis of the eyelens 10. The two mirrors 60 and 64 are parallel to each other and are inclined with respect to the optical axes by an angle of 45°. The pivot 42, rotatably seated in a bore 70 of the pst 50, is maintained in its axial position by a retaining washer 72, and friction to hold the periscope element 52 in any position of swivel is produced by slotting the post 50 to some depth, to make it elastically deformable. The slots 74 are clearly seen in FIG. 8.

Swiveling of the periscopic elements 52 for the purposes of (a) matching of interpupillary distance; (b) swiveling the elements 52 out of the field of view of the user, and (c) compacting the binocular after use, is facilitated by appropriately shaped and located slots 46.

Further provided is a visor-like sun shield 16 articulated at both its ends to the edge of the cap visor 4 by means of pivots 76 and having two defined positions: a lower position which is that shown and in which it is maintained by a projection 78, and an upper position in which it is held by a catch (not shown) at the inside of the shield 16.

Figure 10:
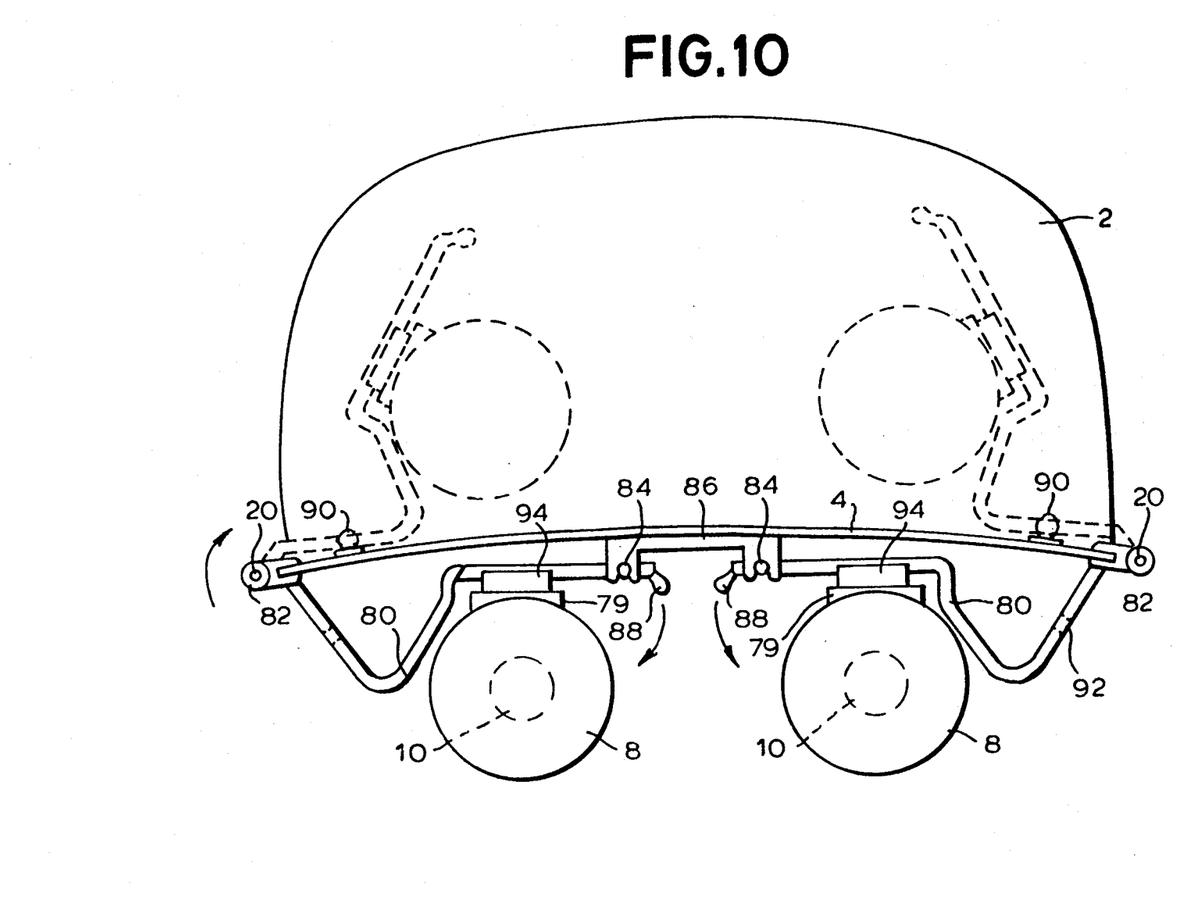
FIG. 10 illustrates yet another embodiment in which the optical systems can be swung out of the way in a lateral direction.

Yet another embodiment is shown in FIG. 10. Here, each optical system, i.e., an objective lens 8 and an eyelens 10, are rigidly mounted on a common frame 79 (or in a common tube, not shown), in proper alignment and at a preset distance. Each frame 79 is supported by an arm 80 articulated to the edge of the visor 4 by means of a hinge 82, the pivot 20 of which extends in a plane parallel to the median plane of the user's head, perpendicular to the plane of the figure, or parallel to the user's axis of view. The arms 80 are held in the position indicated by solid lines, by pins 84 which are an integral part of the arms 80 and which can be pushed into, and are subsequently held by, a catch 86 fixedly attached to the visor 4. When pulled by a handle 88, the arm 80 is released and each optical system can be swung out of the way by swiveling the arm 80 sideways and onto the visor 4, as indicated by dashed lines. To retain the arms in the swung-out position for as long as desired, detent means are provided in the form of a snap fastener comprising a projection 90 attached to the upper side of the visor 4, which projection 90 snaps into an appropriately placed and dimensioned hole 92 in the arm 80.

A further feature of the embodiment of FIG. 10 is the possibility of adjustment to match the user's interpupillary distance. This is made possible by attaching the frame 79 to a block 94 having a groove with a female dovetail profile and giving a portion of the arm 80 the profile of a male dovetail slidingly fitting the female dovetail of the block 94. The double arrows on the blocks 94 indicate the directions in which each of the optical systems can be shifted.

It should be understood that the term "cap" does not necessarily imply a headgear fully covering the head, but could also refer to a mere headband with or without coronal and/or sagittal straps attached thereto.

While the periscopic mirror arrangement of the embodiment of FIG. 8 has the advantage of adding very little to the weight of the binocular, it could also be replaced by a rhomboid prism.

Sun shields can obviously be attached also be those embodiments in which they are not shown in the drawings thereof.

While the erector element shown in some of the embodiments was the prism erector of the Leman type, it is clear that, with some mechanical modifications, other erector prisms, too, could be used. It is furthermore also possible to use a lens-type erector 99, as schematically shown in dotted lines in FIG. 9.

A further embodiment of the binocular telescope according to the invention is shown in FIGS. 11-18. It comprises a multi-bar linkage including a snap-action arrangement, functionally differing from the previous embodiments in that folding up, or unfolding, the objective-lens frame 12 will not only automatically fold up, or unfold, also the eyelens frame 14, but, since the frames 12, 14 cannot be folded simultaneously, as they would collide, will fold up the eyepiece frame 14 before the objective-lens frame 12 has been brought up. Upon unfolding, the eyelens frame 14 will unfold only after the objective-lens frame 12 is safely out of the way.

Figure 11:
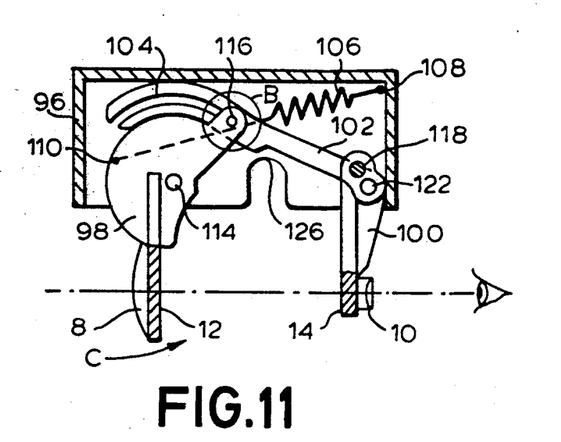
FIG. 11 is a view, in cross-section along plane XI—XI in FIG. 18, of a further embodiment of the binocular telescope according to the invention.
Figure 17:
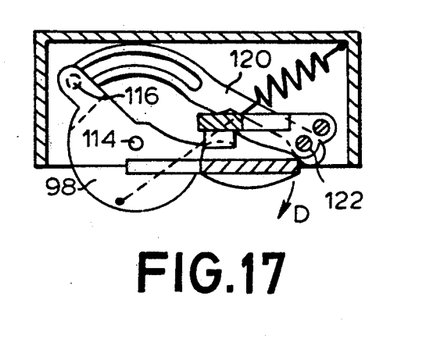
FIG. 17 shows the embodiment of FIG. 11 in the folded state.

The snap-action mechanism is seen in FIG. 11 showing the binocular telescope in the unfolded state and in FIG. 17, illustrating the folded-up state thereof.

Figure 18:
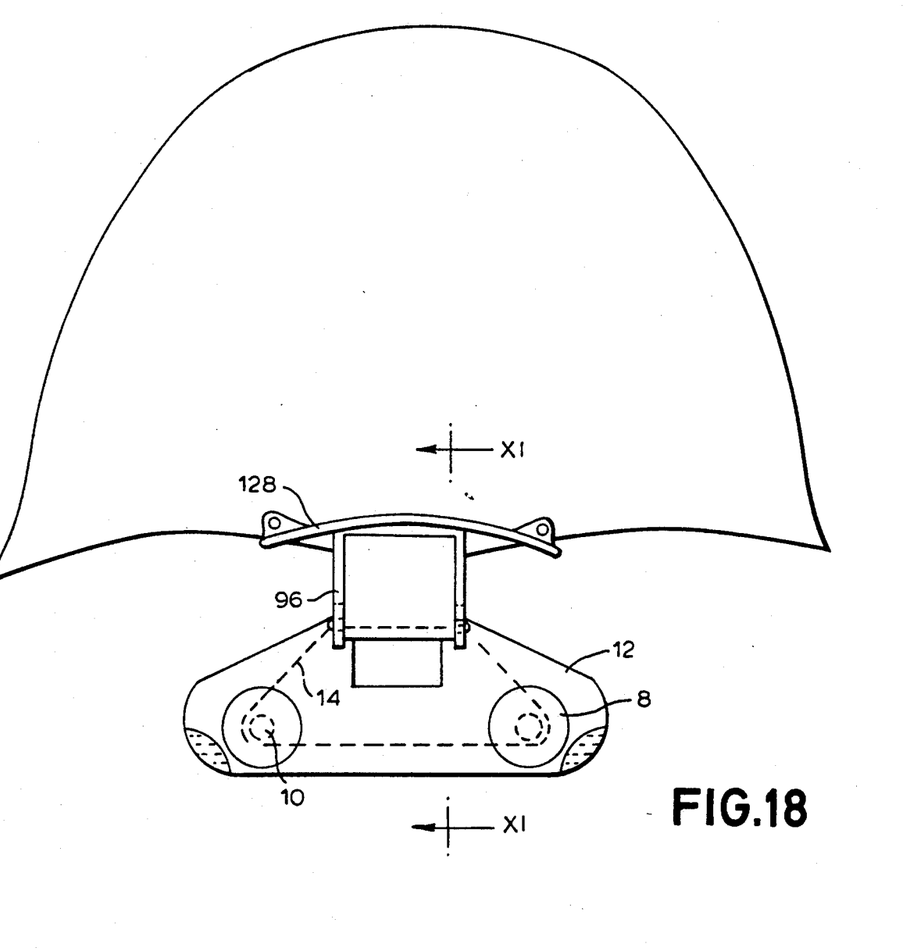
FIG. 18 shows the embodiment of FIG. 11 as mounted on a soldier's steel helmet.

There is seen a box-like housing 96 (shown in cross-section along plane XI—XI of FIG. 18), the top of which is designed to be attached to the visor of a cap, or as seen in FIG. 18, to the front rim of a soldier's or worker's helmet. Inside the housing are located the four elements that produce the above-described snap action: a drum-like member 98 to which is attached, or with which is integral, the objective-lens frame 12, an arm 100 to which is attached, or with which is integral, the eyelens frame 14, a lever 102 being articulated at one end to the arm 100 and having a curved guide groove 104 at the other end, and a helical spring 106, one end of which is anchored to the housing 96 by means of a pin 108, the other end of which is attached to a pin 110 carried by the drum 98.

Figure 12:
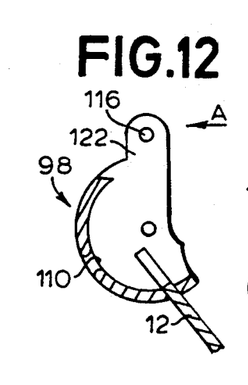
FIG. 12 is a view, in cross-section along plane XII—XII in FIG. 13, of the drum-like member seen in FIG. 11.
Figure 13:
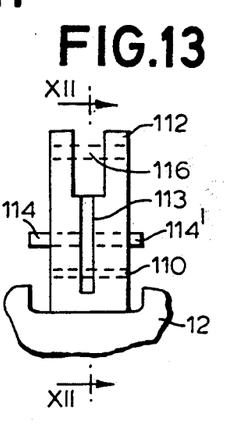
FIG. 13 is a side view, in direction of arrow A, of the drum-like member of FIG. 12.

The drum 98 is shown in FIGS. 12 and 13, the latter being a view in direction of arrow A.

The drum 98 is provided with two pivots 114, 114' by which it is rotatably mounted in appropriate bores in the two major walls of the housing 96.

There is further seen a projection 112 which is slotted to permit passage of the lever 102. Another, narrower, slot 113 is provided to make room for the (non-coiled) end of the spring 106 which, during snap-over from the unfolded position shown in FIG. 11 to the folded-up position shown in FIG. 17, moves (relates to the drum 98) from the left of the drum pivots 114, 114' to the right thereof. Further provided is a pin 116 across the slotted projection 112, which pin, for a purpose to be explained further below, rides in the guide groove 104 of the lower 102.

Figure 14:
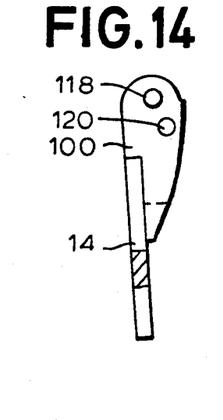
FIG. 14 shows the arm which carries the eyelens frame.
Figure 15:
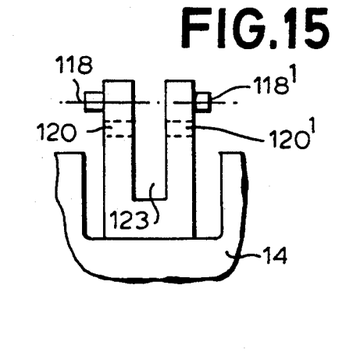
FIG. 15 is a side view of the arm of FIG. 15.

The arm 100 is illustrated in FIGS. 14 and 15. The arm 100, to which is attached, or with which is integral, the eyelens frame 14, is provided with two pivots 118, 118' by which it is pivotably mounted in appropriate bores in the walls of the housing 96 and with two bores 120, 120' which accommodate the hinge pin 122 (FIG. 11) by which the lever 102 is articulated to the arm 100. There is also seen a slot 123 which accommodates the lower end of the lever 102. The non-grooved portion of lever 102 is also provided with a slot (not shown) located in the vertical center plane of the lever, for the (noncoiled) end of the spring 106 to freely pass through.

Figure 16:
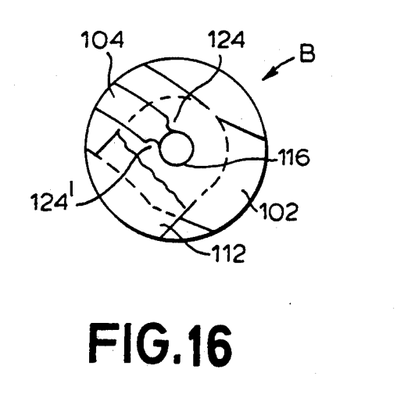
FIG. 16 is a magnified view of detail B in FIG. 11.

The magnified detail B of FIG. 16 shows that the groove 104 of the lever 102 is provided with two small projections 124, 124' which serve as detents retaining the pin 116 of the drum projection 112 in its position at the end of the groove 104 when pressure is applied to the edge of the objective-lens frame 12 in direction of arrow C in order to fold up the frames. Without this detent arrangement, the pin 116 of the drum projection, during folding, would simply slide along the groove 104 without affecting the eyepiece frame 14. As it is, pushing the frame 12 in direction of arrow C will (by rotating the drum 98 in the counterclockwise sense) cause the lever 102 to be pulled along and, via the hinge pin 122, to swivel the arm 100 and, thus, fold up the frame 14. Because the distance between the pivots 118, 118' and the hinge pin 122 is much smaller than the distance between the drum pins 114, 114' and the pin 116 of the drum projection 112, a rotation of the drum 98 by a relatively small angle will cause the frame 14 to swivel upwards by about 90°, that is, until a narrow bridge member of the frame 14 (not shown) abuts against the recesses 126 in the housing walls, thus defining the uppermost swing-out position of the eyelens frame 14. Further pressure on the objective-lens frame 121 will now force the pin 116 past the detent projections 124, 124' and permit the pin 116 to freely travel along the guide groove 104. At this moment the above-mentioned "snap action" is initiated. As the objective-lens frame 12 continues to be rotated in direction of arrow C, the longitudinal axis of the spring 106, i.e., the line connecting the pins 108 and 110, begins to tilt downwards. As soon as, in its downward tile, this line passes the imaginary line connecting the pin 108 and pivot 114 of the drum 98, the system being spring 106/drum 98 becomes "over-centered", and snaps through, completing the folding-up of frame 12 without further application of force.

FIG. 17 illustrates the folded binocular telescope according to this embodiment, and FIG. 18 shows the binocular as attached to a helmet by means of a bracket 128.

Upon unfolding, pulling the objective-lens frame 12 in direction of arrow D in FIG. 17 will initiate reverse snap action which takes place when, upon clockwise rotation of the drum 98, the spring arrives at the above-mentioned over-centering position, throwing the pin 116 first against the detents 124, 124', which causes the lever 102 to push the eyelens frame 14 downwards towards the unfolded position and finally forcing the pin 116 over the detents 114, 114' and against the end of the groove 104.

The final angular position of the eyelens frame 14 is defined by the stop means, e.g., the lateral wall of the housing 96. This position clearly determines the unfolded position of the objective-lens frame 12, defining as it does a triangle: pivot 114→pin 116, pin 116→pin 122, and pin 122→pivot 116. The lengths of the side of this triangle have been predetermined to such effect that the respective planes of frames 12 and 14, when in the unfolded state as shown in FIG. 11, will always be parallel.

Figure 19:
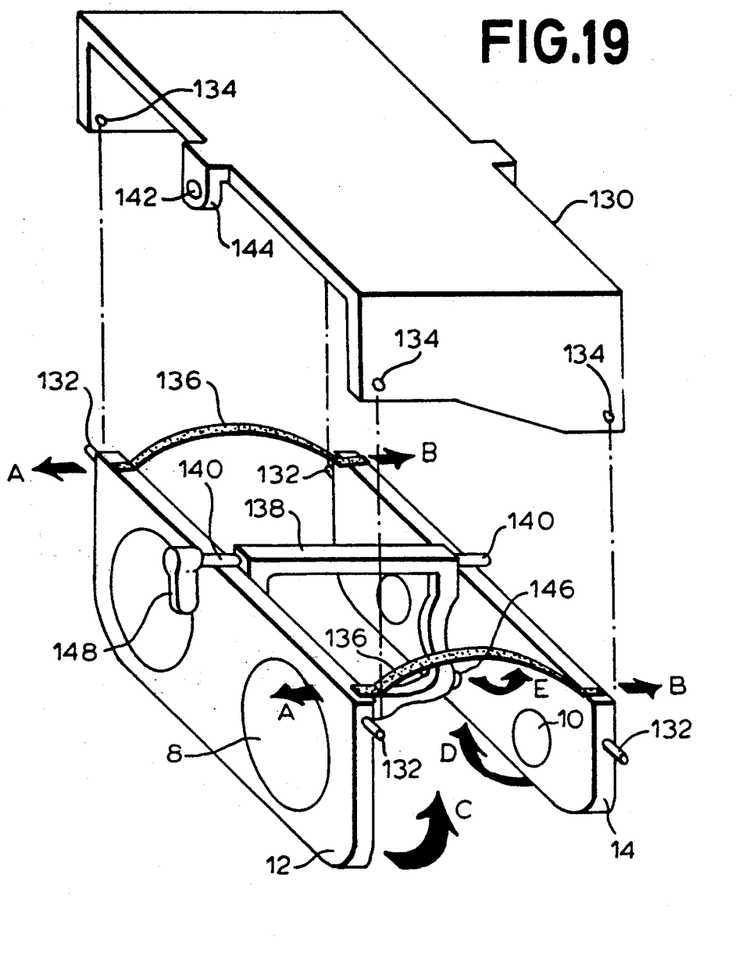
FIG. 19 is an exploded perspective view of yet another embodiment of the binocular telescope according to the invention.

Yet another embodiment of the invention is shown in FIG. 19.

Figure 20:
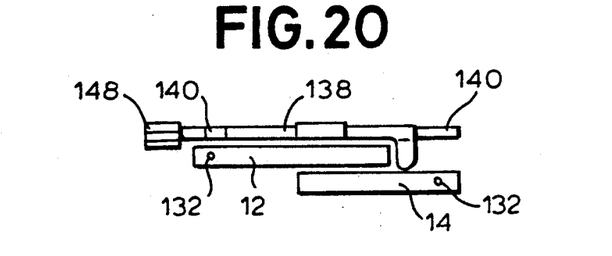
FIG. 20 shows the two lens frames in the folded position.

There is seen a housing 130 which accommodates an objective-lens frame 12 and an eyelens frame 14. These two frames are provided with pivots 132 which, in assembly, are pivotably mounted in appropriate bores 134 in the housing 130. Two flat springs 136, pressed in assembly against the "ceiling" of the housing 130, exert pressure on the frames 12, 14 in direction of arrows A, B, producing a moment about the pivots 132 and thus biasing the frames 12, 14 in direction of arrows C, D, i.e., towards the folded state shown in FIG. 20.

What keeps the two frames 12, 14 in the unfolded position, in which they must also be located in parallel planes for collinearity of the optical axes of the objective lenses 8 and the eyelenses 10, is a hinged spacer 138 provided with pivots 140 mounted in bores 142 located in tongues 144 integral with the housing 130 and retained in the position shown in FIG. 19 by indexing detents in the form of, e.g., shallow recesses 146 in the inside surfaces of the frame 12, 14.

For collapsing the binocular, i.e., for folding up the frames 12, 14, a thumbscrew 148 is provided, permitting the spacer 138 to be swung in direction of arrow E and thus allowing the springs 136 to fold up the two frames.

For unfolding the frames 12, 14, the thumbscrew 148 is turned in the other direction, causing the spacer to spread the folded frames open. The correct position of the frames 12, 14 is ensured when the spacer 138 drops into the indexing detents 146.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A binocular telescope mountable on a headgear, comprising:

two optical systems, one for each eye of a user, each system having an optical axis comprising at least an objective lens and an eyelens, and means for attaching said systems to a headgear, said attaching means including means for pivoting said optical systems, with said headgear in position on a user's head, so that said objective lenses and said eyelenses can be pivoted about individual axes in a predetermined sequence out of the way to facilitate free and unaided vision in a first position, and returned to a second position of telescope-aided vision.

2. The telescope as claimed in claim 1, further comprising means to substantially define prior to use, and maintain during use, collinearity of the optical axes of said objective lens and said eyelens.

3. The telescope as claimed in claim 1, wherein each of said systems is a Galilean system comprising a positive objective lens and a negative eyelens.

4. The telescope as claimed in claim 1, wherein each of said systems is a terrestrial system, comprising a positive objective lens, a positive eyelens and an erector system.

5. The telescope as claimed in claim 4, wherein said erector system comprises at least one lens interposable between said objective lens and said eyelens.

6. The telescope as claimed in claim 4, wherein said erector system comprises at least one prism interposable between said objective lens and said eyelens.

7. The telescope as claimed in claim 6, wherein said at least one prism is a plastic prism.

8. The telescope as claimed in claim 1, further comprising adjustment means to vary the distance between said objective lens and said eyelens.

9. The telescope as claimed in claim 1, further comprising sun shield means introducible into, and removable from, the optical axes of said systems.

10. The telescope as claimed in claim 1, further comprising means to vary the interpupilar distance of said two systems.

11. The telescope as claimed in claim 1, wherein the lenses of said systems are plastic lenses.

12. The telescope as claimed in claim 1, wherein the lenses of said systems are mounted in lens frames.

13. The telescope as claimed in claim 12, wherein said lenses and said lens frames are integrally molded plastic components.

14. The telescope as claimed in claim 1, wherein said objective lenses and said eyelenses can be made to swivel about axes extending in planes parallel to the coronal plane of the user's head.

15. The telescope as claimed in claim 1, further comprising means for facilitating free and unaided vision as well as returning to telescope-aided vision by actuating either said objective lenses or said eyelenses, wherein actuation of one of said lenses, automatically actuates the other of said lenses.

16. The telescope as claimed in claim 1, attaching said means comprising a multi-bar linkage including a snap-action arrangement.

17. The telescope as claimed in claim 16, said multi-bar linkage comprising means for ensuring that said automatic actuation proceeds sequentially, one of said lenses after the other of said lenses.

18. The telescope as claimed in claim 16, further comprising abutment and detent means for ensuring, during use, the collinearity of said objective lenses and said eyelenses.

19. The telescope as claimed in claim 1, wherein said means for pivoting to facilitate free and unaided vision as well as return to telescope-aided vision comprises a swiveling spacer adapted to spread said objective lenses and said eyelenses apart against bias of a spring and to maintain proper orientation for telescope-aided vision, or to allow said spring to fold up said objective lenses and said eyelenses for free, unaided vision.

20. A binocular telescope mountable to a headgear, comprising:

two optical systems, each optical system comprising at least an objective lens and an eyelens, and means for attaching each of said optical systems to a support member of a headgear, said attaching means including means for pivoting said optical systems about individual axes, between a first position in which said optical systems are substantially aligned with an axis of view of a user's eye and a second position in which said optical systems are pivoted away from the axis of view of a user's eye to enable unaided vision, said pivoting means comprising individual pivot axes for each of said optical systems and means for detecting said optical systems in each of said first and second positions, said detecting means comprising elements connected to said optical systems, for positioning said optical systems in said first and second positions and cooperating with cooperating elements connected to opposite surfaces of the support member of a headgear.

21. The telescope as claimed in claim 20, wherein said objective lenses and said eyelenses can be made to swivel about axes extending in planes parallel to the median plane of the user's head.

22. The telescope as claimed in claim 20, further comprising means for defining and maintaining, collinearity of the optical axes of said objective lens and said eyelens.

23. The telescope as claimed in claim 20, further comprising means for varying an interpupilar distance of said optical systems.

* * * * *

UNITED STATES PATENT AND TRADEMARK OFFICE
CERTIFICATE OF CORRECTION

PATENT NO. : 5,282,086

DATED : January 25, 1994

INVENTOR(S) : P. Goldstein

It is certified that error appears in the above-indentified patent and that said Letters Patent is hereby corrected as shown below:

At the cover, section [56], under "Foreign Patent Documents" of the printed patent, please add the following items:
---74869    4/85    Israel
   949038   8/49    France---.
At column 1, line 6 of the printed patent, add ---,--- after "telescope".
At column 3, line 14 of the printed patent, delete "and".
At column 9, line 15 (claim 16, line 1) of the printed patent, change "attaching said" to ---said attaching---.

Signed and Sealed this

Sixth Day of September, 1994

Attest:

BRUCE LEHMAN

Attesting Officer    Commissioner of Patents and Trademarks